SQUARE LOOP FERROMAGNETIC MATERIAL

Filed June 17, 1959 4 Sheets-Sheet 1

INVENTOR.
FRANK G. BROCKMAN
PAUL W. BECK
KENNETH E. MATTESON
BY
Frank R. Jifai
AGENT June 19, 1962 F. G. BROCKMAN ET AL 3,039,966

SQUARE LOOP FERROMAGNETIC MATERIAL

Filed June 17, 1959 4 Sheets-Sheet 2

INVENTORS.
FRANK G. BROCKMAN
PAUL W. BECK
KENNETH E. MATTESON

BY Frank R. Jirofoni
AGENT

INVENTORS.
FRANK G. BROCKMAN
PAUL W. BECK
KENNETH E. MATTESON
BY
Frank R. Jeifari
AGENT June 19, 1962 F. G. BROCKMAN ET AL 3,039,966

SQUARE LOOP FERROMAGNETIC MATERIAL

Filed June 17, 1959 4 Sheets-Sheet 4

INVENTORS.
FRANK G. BROCKMAN
PAUL W. BECK
KENNETH E. MATTESON

BY Frank R. Trifari
AGENT

United States Patent Office 3,039,966

Patented June 19, 1962

3,039,966

SQUARE LOOP FERROMAGNETIC MATERIAL

Frank G. Brockman, Dobbs Ferry, Paul W. Beck, Irvington, and Kenneth E. Matteson, Mahopac, N.Y., assignors to North American Philips Company, Inc., New York, N.Y., a corporation of Delaware Filed June 17, 1959, Ser. No. 821,060
7 Claims. (Cl. 252—62.5)

Our invention relates to ferromagnetic materials and in particular to ferromagnetic materials having a substantially square or rectangular hysteresis loop.

Ferromagnetic cores having a substantially square or rectangular hysteresis loop are used in magnetic memory devices; it is desirable that such materials have certain specific properties, among which are a low coercive force, a high "squareness ratio" or "$\alpha$," and sharp corners in the hysteresis loop.

It is a principal object of our invention to provide a non-metallic ferromagnetic material having a substantially square hysteresis loop.

It is a further object of our invention to provide a ferromagnetic material having a squareness ratio of at least 0.5, with large values of $B_r$ and small values of $H_c$.

It is another object of our invention to provide a ferromagnetic material having a hysteresis loop with sharp corners.

These and further objects of the invention will appear as the specification progresses.

In a memory device, a core stores information in the form of magnetic energy by the application of a pulse which energizes the core initially into one state of polarization. To read out the information thus stored in the core, a second pulse of opposite polarity is applied to the core which causes a reversal of the polarization of the core enabling the energy stored in the core to be transferred to appropriate readout circuits.

Such cores must have certain well-defined characteristics among which are that the ferromagnetic material have a substantially rectangular or square hysteresis loop. That is to say, the hysteresis loop should approach very nearly a rectangle, the corners of which should be sharp; the slope of the sides of the rectangle should be very steep approaching almost a vertical inclination; and the loop should be relatively narrow.

These characteristics can be measured. For instance, the breadth of the loop is determined by the field required to demagnetize the material, which is referred to as the coercive force ($H_c$). The "squareness ratio," hereinafter referred to as $\alpha$ is a figure of merit which determines the extent to which the loop approaches a rectangle. Sharp corners can be observed from the loop itself.

The materials according to the invention are characterized by a high degree of rectangularity, i.e., a relatively high $\alpha$, and a low coercive force.

In accordance with our invention we have found that a ferromagnetic ferrite material, obtained by firing an intimate mixture of about 10 to 48.5 mol percent of NiO, about 1.5 to 32.5 mol percent of ZnO, about 0.2 to 7 mol percent of CoO, about 0.2 to 7.5 mol percent of CuO, and about 47.5 to 49.8 mol percent of $Fe_2O_3$ at a temperature of about 1000° C. to 1300° C., and preferably between 1050° and 1200° C. has a substantially square loop with a low coercive force and a high value of $\alpha$.

Each of the constituents specified are essential in order to obtain a material having the desired properties. While the zinc oxide may be eliminated, the resulting material has a rather high coercive force making it generally unsatisfactory for its intended application. It is also essential that the material contain a deficiency of ferric oxide with respect to the other oxides, i.e., that the ferric oxide be less than 50 mol percent of the mixture. If the mixture contains the stoichiometric amount (50 mol percent) of ferric oxide, we do not obtain a ferrite having a substantially square hysteresis loop.

In a preferred embodiment of the invention we heat an intimate mixture of about 15 to 42.5 mol percent of NiO, about 10 to 30 mol percent of ZnO, about 0.5 to 5 mol percent of CoO, about 0.5 to 5 mol percent of CuO, about 48.5 to 49.5 mol percent of $Fe_2O_3$.

Instead of oxides or compounds of those materials which upon heating decompose, we may use carbonates, nitrates, oxalates, etc. which upon heating form the respective oxides, and in some cases, we prefer to use these compounds since they are easier to obtain.

The materials according to our invention are made by intimately mixing the oxides, or compounds which thermally decompose to form those oxides, in the desired proportions, and after forming bodies of desired shape and dimensions, heating them at a temperature of about 1000° C. to 1300° C. for a sufficient time to react the oxides and form a ferrite material. Generally, the atmosphere and time of heating are not critical except that reducing atmosphere should be avoided. We prefer to heat in air, but atmospheres containing more oxygen than air can be used. As for heating time, we generally have maintained the bodies at the firing temperatures for two to ten hours; depending upon their size, shorter heating times may be employed. Similarly, we have found that heating for as long as fifty hours has no material effect on the properties.

The materials may be prefired to improve the reaction between the constituents. After prefiring, the material should be ground and formed into bodies of desired shape and dimensions.

The pressure used in forming the bodies is not critical. Sufficient pressure should be employed to form a fairly coherent body. Binders which leave no deleterious residue may be employed but these should be expelled at fairly low temperatures.

The invention will be described in connection with the accompanying drawing, in which.

Figure 1:
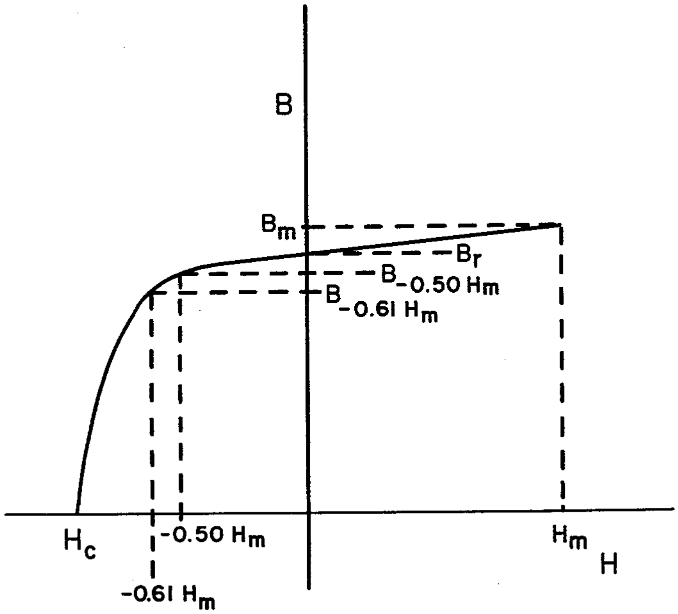
FIGURE 1 is a portion of a hysteresis loop illustrating the various quantities referred to herein.

FIGURE 1 shows the upper portion of a hysteresis loop. When a field of $H_m$ oersteds is applied to the material, a flux of $B_m$ gauss passes through the material. The field $H_m$ is that field at which the maximum squareness ratio (see below) is obtained. If the field is removed, i.e., reduced to zero, a residual flux remains in the material which is designated the remanence, $B_r$.

In order to demagnetize the material, a field of opposite polarity and having an intensity $H_c$ must be applied. This field is equal to the coercive force of the material. This field should have a value of 5 oersted or less.

"Squareness ratio" or $\alpha$ may be defined by terms of the magnetic quantities illustrated in FIGURE 1. A commonly accepted definition is the ratio $$\alpha_{.50}=\left[\frac{B_{-0.50H_m}}{B_m}\right]_{max}$$

wherein $B_m$ is the magnetic induction at that maximum applied field, $H_m$, which results in a maximum value of this ratio and $B_{0.50H_m}$ is the magnetic induction in the second quadrant of the hysteresis loop at an applied field of 0.50 times $H_m$.

A more stringent definition of squareness ratio results if the second quadrant magnetic induction is chosen at a fraction of the maximum applied field greater than 0.50. We have chosen the definition which employs a ratio of 0.61 and may be defined in a manner analogous to that above:

$$\alpha_{0.61}=\left[\frac{B_{-0.61H_m}}{B_m}\right]_{max}$$

The "squareness ratio" thus described was measured on a 60 cycle per second B-H hysteresis loop tracer. For a given sample the applied field was increased in relatively small increments and a photograph taken of the hysteresis loop at each applied field. The values of the ratio of magnetic inductions $B_{-0.61Hm}$ and $B_m$ was determined for each hysteresis loop. The maximum value of this ratio was then taken as the "squareness ratio," $\alpha_{0.61}$, of the sample. The value of $H_m$, given in the tables which follow, is the value at which $\alpha_{0.61}$ is a maximum.

The following table illustrates the values of $\alpha_{0.61}$ of a number of materials made according to the invention as compared with materials outside the scope of the invention.

All of the materials were made in the following manner. Powdered ferric oxide, nickel carbonate, cobalt carbonate, copper carbonate (or copper oxide) and zinc oxide in proportions producing the desired composition in terms of mol percent were thoroughly and intimately mixed in a high-speed mixer. This mixture was prefired at about 900° C. for about 1 hour on temperature. After ball-milling the pre-fired mixture was formed into bodies of desired shape and dimensions, usually toroids, about 3 cms. O.D., 2 cms. I.D., and 0.7 cm. high. The bodies were thereafter fired in air at a temperature of about 1150° C. for about 10 hours.

tions of the constituent oxides should be within the ranges specified. This is shown by the series of graphs illustrated in FIGS. 3 to 6.

Figure 3:
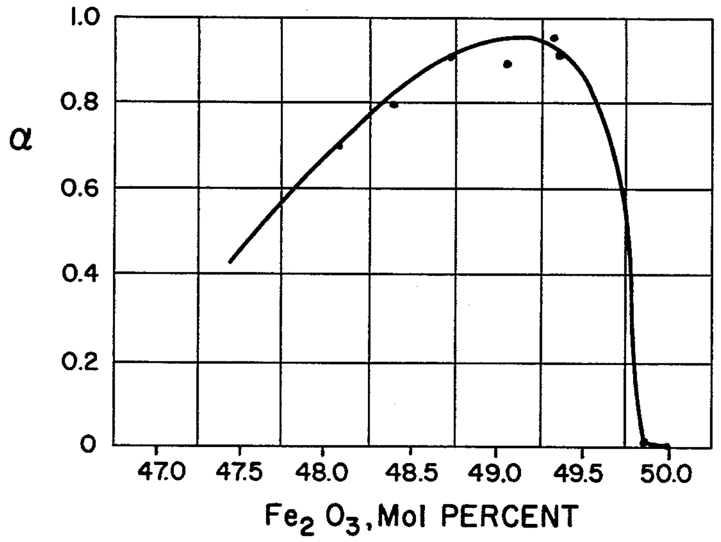
FIGURES 3 to 6 are graphs showing the relationship of the concentrations of the various constituents with respect to the properties of the material.

FIG. 3 shows the highest values of $\alpha_{0.61}$ observed at given iron oxide molar concentrations with a substantially constant nickel oxide to zinc oxide molar ratio. The graph clearly shows that the upper limit of the iron oxide molar concentration should not exceed 49.8 mol percent. This, then, shows that the material should have a deficiency of iron oxide with respect to a stoichiometric composition, i.e., a stoichiometric composition should contain 50 mol percent of iron oxide. The lower limit of iron oxide molar concentration is clearly indicated at about 47.5 mol percent.

Figure 4:
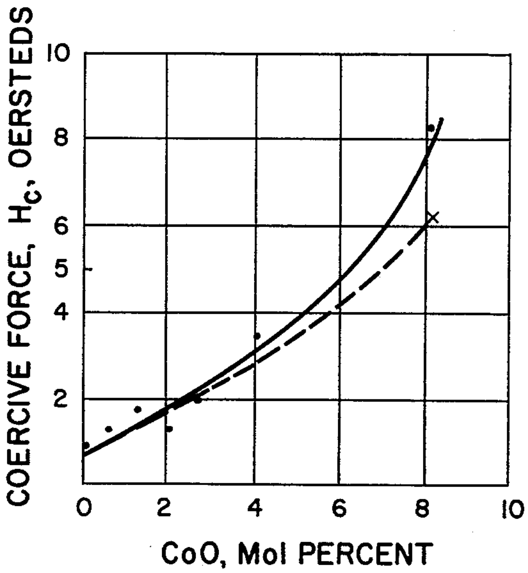

FIG. 4 shows the relationship of the cobalt oxide molar concentration and the coercive force. The iron oxide molar concentration and the CuO molar concentrations were kept constant at 49.37 mol percent and 2.53 mol percent respectively. The actual molar concentrations of NiO and ZnO varied as the CoO concentration was varied but the molar ratio NiO/ZnO was kept constant.

We have also included a single point at which the molar concentration of the CuO was increased to 5.06 to show the effect of increasing the concentration of that constituent.

From this graph, an upper limit of about 7 mol percent of CoO is indicated for a composition which has a coercive force of 5 oersted or less.

Figure 5:
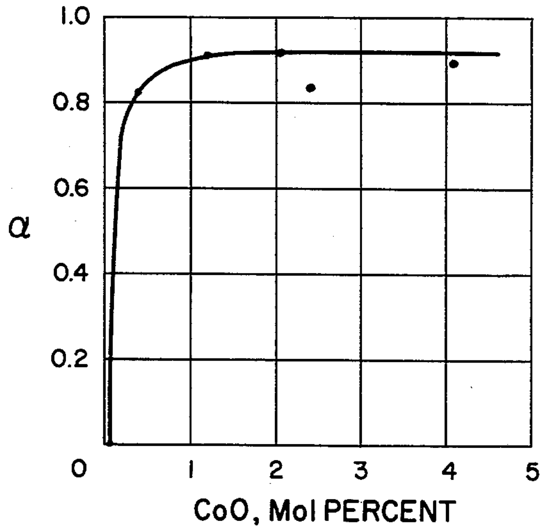

FIG. 5 shows the relationship of the values of $\alpha_{0.61}$ observed with different molar concentrations of cobalt. The molar concentrations of $Fe_2O_3$ and CuO were kept constant at 49.37 mol percent and 2.53 mol percent respectively. The actual molar concentrations of NiO and ZnO varied as the CoO concentration was varied, but the ratio of NiO/ZnO was kept constant at 64/36.

This graph clearly indicates that the lower limit of CoO should be 0.2 mol percent.

Figure 6:
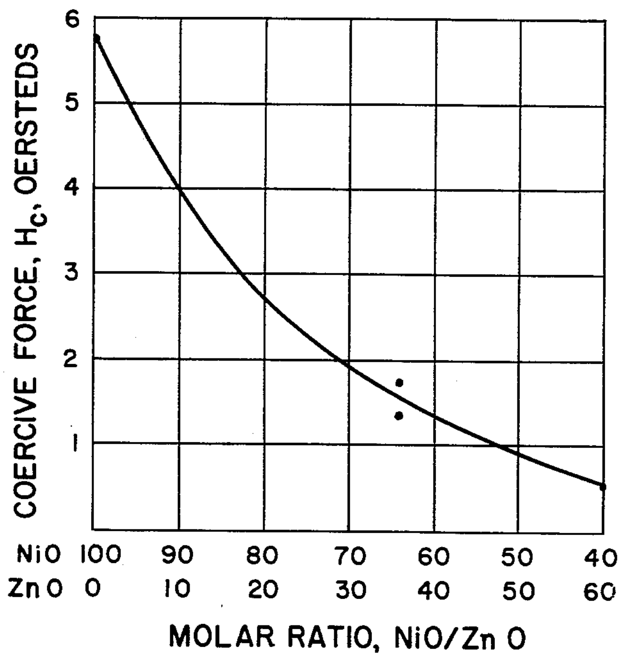

FIG. 6 shows the relationship of the coercive force and

*Table I*

STARTING COMPOSITION IN MOL PERCENT

| Sample No. | $Fe_2O_3$ | NiO | ZnO | CoO | CuO | $H_m$ | $H_c$ | $B_r$ | $B_m$ | $\alpha_{0.61}$ |
|---|---|---|---|---|---|---|---|---|---|---|
| 1 | 48.06 | 30.24 | 17.00 | 2.10 | 2.60 | 2.55 | 1.84 | 830 | 1,000 | .70 |
| 2 | 48.06 | 27.81 | 15.64 | 0.70 | 7.79 | 1.24 | 0.80 | 980 | 1,140 | .13 |
| 3 | 48.09 | 26.86 | 15.14 | 2.11 | 7.80 | 2.33 | 1.56 | 630 | 830 | .42 |
| 4 | 48.39 | 29.44 | 16.56 | 1.74 | 3.87 | 2.04 | 1.40 | 1,595 | 1,770 | .80 |
| 5 | 48.72 | 32.82 | 18.46 | ------ | ------ | 7.90 | 3.40 | 1,025 | 1,580 | (*) |
| 6 | 48.72 | 31.95 | 17.95 | 1.38 | ------ | 7.50 | 5.05 | 980 | 1,400 | .26 |
| 7 | 48.72 | 29.85 | 16.79 | 2.08 | 2.56 | 2.22 | 1.65 | 1,710 | 1,840 | .85 |
| 8 | 48.72 | 29.54 | 16.62 | ------ | 5.13 | 1.50 | 0.77 | 1,520 | 2,000 | (*) |
| 9 | 48.72 | 28.67 | 16.10 | 1.38 | 5.13 | 1.31 | 1.03 | 2,420 | 2,570 | .91 |
| 10 | 48.72 | 28.21 | 15.87 | 2.08 | 5.13 | 1.92 | 1.50 | 2,530 | 2,720 | .88 |
| 11 | 49.04 | 29.51 | 16.60 | 1.03 | 3.82 | 1.50 | 1.11 | 1,870 | 2,030 | .84 |
| 12 | 49.05 | 29.06 | 16.35 | 1.72 | 3.82 | 1.50 | 1.19 | 1,860 | 2,020 | .89 |
| 13 | 49.37 | 30.77 | 17.31 | 2.05 | 0.51 | 7.50 | 5.70 | 1,960 | 2,360 | .64 |
| 14 | 49.37 | 30.72 | 17.28 | 0.10 | 2.53 | 1.57 | 0.85 | 565 | 910 | (*) |
| 15 | 49.37 | 30.33 | 17.08 | 0.68 | 2.53 | 1.77 | 1.32 | 2,010 | 2,180 | .83 |
| 16 | 49.37 | 29.90 | 16.82 | 1.37 | 2.53 | 2.28 | 1.74 | 2,850 | 3,000 | .91 |
| 17 | 49.37 | 29.47 | 16.57 | 2.05 | 2.53 | 1.71 | 1.37 | 2,545 | 2,650 | .92 |
| 18 | 49.37 | 29.03 | 16.33 | 2.73 | 2.53 | 2.70 | 2.00 | 2,065 | 2,320 | .84 |
| 19 | 49.37 | 28.15 | 15.85 | 4.10 | 2.53 | 4.40 | 3.45 | 1,975 | 2,120 | .90 |
| 20 | 49.32 | 25.57 | 14.39 | 8.19 | 2.53 | 9.40 | 8.30 | 2,850 | 3,000 | .92 |
| 21 | 49.32 | 23.96 | 13.47 | 8.19 | 5.06 | 7.90 | 6.25 | 2,910 | 3,000 | .95 |
| 22 | 49.37 | 27.10 | 15.25 | 0.68 | 7.60 | 1.52 | 0.68 | 1,360 | 1,740 | (*) |
| 23 | 49.41 | 26.18 | 14.76 | 2.05 | 7.60 | 2.28 | 1.38 | 1,185 | 1,430 | (*) |
| 24 | 49.86 | 27.36 | 18.24 | 2.03 | 2.51 | 2.50 | 1.09 | 2,240 | 2,910 | (*) |
| 25 | 50.00 | 32.00 | 18.00 | ------ | ------ | 7.50 | 3.13 | 825 | 1,400 | (*) |
| 26 | 50.00 | 31.15 | 17.50 | 1.35 | ------ | 7.70 | 2.88 | 1,050 | 1,750 | (*) |
| 27 | 50.00 | 28.67 | 16.13 | 2.70 | 2.50 | 3.75 | 1.82 | 1,510 | 2,400 | (*) |
| 28 | 50.00 | 28.80 | 16.20 | ------ | 5.00 | 1.34 | 0.74 | 1,830 | 2,230 | (*) |
| 29 | 50.00 | 27.95 | 15.70 | 1.35 | 5.00 | 1.54 | 0.94 | 2,530 | 2,840 | (*) |
| 30 | 48.73 | 45.93 | -------- | 2.77 | 2.56 | 20.00 | 14.50 | 1,100 | 1,250 | .77 |
| 31 | 48.73 | 44.76 | -------- | 1.38 | 5.13 | 7.50 | 4.35 | 550 | 830 | (*) |
| 32 | 49.38 | 46.72 | -------- | 1.37 | 2.53 | 7.85 | 5.75 | 740 | 960 | .57 |
| 33 | 49.37 | 42.84 | -------- | 2.73 | 5.06 | 11.30 | 8.10 | 1,330 | 1,400 | .89 |
| 34 | 48.73 | 9.47 | 37.85 | 1.38 | 2.56 | 108.00 | -------- | -------- | 212 | (*) |
| 35 | 48.73 | 8.67 | 34.70 | 2.77 | 5.13 | 1.58 | 0.33 | 850 | 1,390 | (*) |
| 36 | 49.37 | 9.07 | 36.29 | 2.73 | 2.53 | 113.50 | -------- | -------- | 256 | (*) |
| 37 | 49.37 | 8.84 | 35.37 | 1.37 | 5.06 | 2.50 | 0.14 | 275 | 770 | (*) |
| 38 | 49.35 | 18.43 | 27.64 | 2.05 | 2.53 | 0.63 | 0.59 | 2,790 | 2,905 | .93 |

NOTE.—(*) indicates that $\alpha_{0.61}$ is either 0 or negative.

In order to obtain material having a coercive force of 5 oersted or less and an $\alpha_{0.61}$ of at least 0.5, the proporthe molar ratio of NiO to ZnO, the CuO concentration being constant at 2.53 mol percent, the cobalt oxide concentration being either 1.37 or 2.05 mol percent and the iron oxide concentration being 49.35 to 49.38 mol percent.

This graph clearly indicates an upper limit of the molar ratio of nickel oxide to zinc oxide of NiO/ZnO of 96.5/3.5. In the compositions of this invention (containing iron oxide, cobalt oxide, and copper oxide as well as nickel oxide and zinc oxide) this corresponds to a concentration of about 48.5 mol percent of NiO and about 1.5 mol percent of ZnO.

Figure 7:
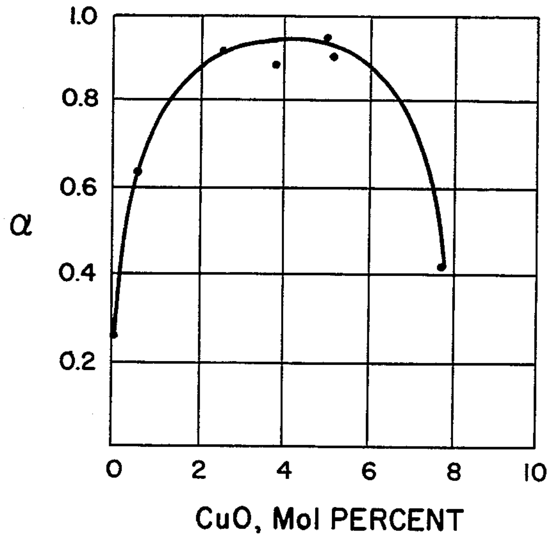
FIGURE 7 is a graph showing the effect of firing conditions on properties.

FIG. 7 shows the relationship of the highest values of $\alpha_{0.61}$ observed at given copper oxide concentrations (the ratio of nickel oxide to zinc oxide kept constant).

The upper and lower limits of the copper oxide molar concentration are clearly indicated as 7.5 mol percent and 0.2 mol percent respectively.

Table II shows the effect of firing temperature and firing time on one composition ($Fe_2O_3$, 48.72 mol percent; NiO, 28.67 mol percent; ZnO, 16.10 mol percent; CoO, 1.38 mol percent; and CuO, 5.13 mol percent).

*Table II*

| Sample No. | Temp., ° C. | Time, hours | $H_m$ | $H_c$ | $B_r$ | $B_m$ | $\alpha_{0.61H_m}$ |
|---|---|---|---|---|---|---|---|
| A-1 | 1,000 | 10 | 10.00 | 6.30 | 1,020 | 1,420 | .18 |
| A-2 | 1,050 | 2 | 12.50 | 6.75 | 950 | 1,400 | (*) |
| A-3 | 1,050 | 10 | 2.83 | 2.28 | 2,770 | 2,920 | .90 |
| A-4 | 1,100 | 2 | 3.01 | 2.44 | 2,000 | 2,220 | .81 |
| A-5 | 1,100 | 10 | 2.07 | 1.62 | 2,930 | 3,050 | .91 |
| A-6 | 1,100 | 50 | 1.59 | 1.32 | 2,670 | 2,810 | .88 |
| A-7 | 1,150 | 2 | 1.58 | 1.13 | 1,690 | 1,860 | .83 |
| A-8 | 1,150 | 10 | 1.51 | 1.12 | 2,700 | 2,840 | .91 |
| A-9 | 1,175 | 10 | 1.22 | 0.99 | 1,910 | 2,060 | .86 |
| A-10 | 1,200 | 2 | 1.48 | 0.99 | 860 | 990 | .37 |
| A-11 | 1,200 | 10 | 1.30 | 0.84 | 940 | 1,090 | .28 |
| A-12 | 1,250 | 2 | 1.05 | 0.77 | 770 | 950 | .32 |
| A-13 | 1,250 | 10 | 0.93 | 0.62 | 765 | 1,020 | .13 |
| A-14 | 1,300 | 10 | 0.70 | 0.42 | 840 | 1,200 | (*) |

NOTE.—(*) indicates that $\alpha$ is either 0 or negative.

Table III shows the effect on firing temperature and firing time of a composition containing more zinc ($Fe_2O_3$, 49.35 mol percent; NiO, 18.43 mol percent; ZnO, 27.64 mol percent; CoO, 2.05 mol percent; and CuO, 2.53 mol percent).

*Table III*

| Sample No. | Temp., ° C. | Time, hours | $H_m$ | $H_c$ | $B_r$ | $B_m$ | $\alpha_{0.61H_m}$ |
|---|---|---|---|---|---|---|---|
| B-1 | 1,050 | 10 | 3.75 | 1.74 | 760 | 1,270 | (*) |
| B-2 | 1,100 | 10 | 1.38 | 1.06 | 1,900 | 2,080 | .84 |
| B-3 | 1,150 | 10 | 0.63 | 0.59 | 2,790 | 2,905 | .93 |
| B-4 | 1,175 | 10 | 0.70 | 0.59 | 2,750 | 2,890 | .91 |
| B-5 | 1,250 | 10 | 0.45 | 0.39 | 2,210 | 2,350 | .77 |
| B-6 | 1,300 | 10 | 0.38 | 0.24 | 1,350 | 1,590 | .10 |

NOTE.—(*) indicates that $\alpha$ is either 0 or negative.

Figure 8:
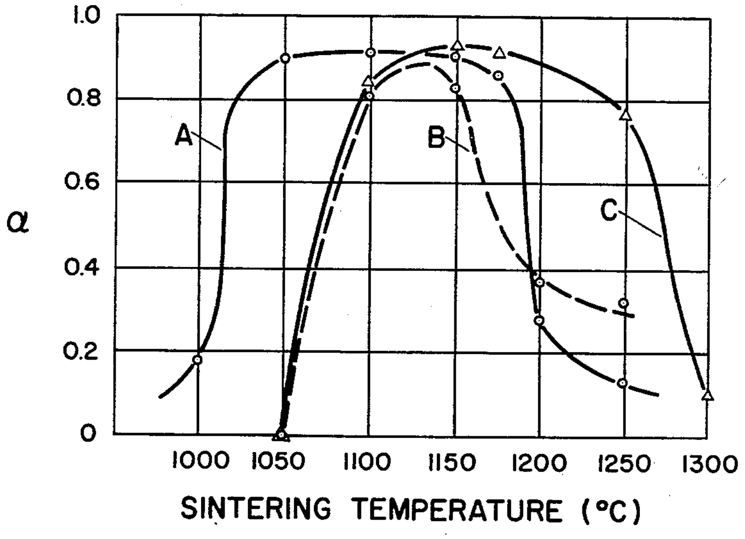

These results are shown graphically in FIG. 8. Curve A is for a firing time on-temperature of ten hours for the composition used for the data in Table II. Curve B is for the same composition, but with the firing time on-temperature of 2 hours. Curve C is for a firing time-on temperature of 10 hours for the composition used for the data in Table III.

These curves clearly indicate that the firing temperature is more critical than firing time and should be from about 1000° C. to 1300° C.

Another feature of some of these materials is that they are susceptible to magnetic treatment at room temperature. By magnetic treatment we mean the following: a completely demagnetized sample in the form of a toroid is measured in the circumferential direction, beginning at zero magnetizing field with observations of the induction and the loop characteristics being made step-wise with successively increased values of the magnetizing field. After the field strength at which the squareness is a maximum is exceeded in these measurements then the field strength is raised to a high value (about 100 oersted) for a few seconds, and then reduced to zero. When now the step-wise measurements are repeated it is found that the squareness is increased and that a lower value of applied field is required to produce the maximum squareness. The toroidal ring remains in this state until intentionally demagnetized, for instance, by placing the ring in a strong 60 cycle per second alternating field along the axis of the toroid (that is, particular to the measuring direction), and then reducing this perpendicular alternating field to zero. The square loop properties of the ring measured in the circumferential direction after this perpendicular demagnetization, are now similar to the original properties in the demagnetized state, but upon the application of a sizeable field, about 100 oersteds, in the circumferential direction, the superior square loop properties are again developed. Not all the compositions studied are susceptible to this treatment, all measurements given in the tables have been made after a relatively strong circumferential field had been applied for a few seconds.

It should be pointed out that it may or may not be necessary to use this magnetic treatment to develop the square loop properties. For example, some samples were measured in the demagnetized state, and then after the magnetic treatment with the following results:

Sample No. 16, prior to the magnetic treatment had an $\alpha_{0.61}$ of 0.79 and after the circumferential magnetic treatment the $\alpha_{0.61}$ increased to 0.91.

Sample No. 12, prior to the magnetic treatment had an $\alpha_{0.61}$ of 0.87 and after the circumferential magnetic treatment the $\alpha_{0.61}$ increased only slightly, to $\alpha_{0.61}$ of 0.89.

Sample No. 38, prior to the magnetic treatment had an $\alpha_{0.61}$ of 0.93 and after the circumferential magnetic treatment the $\alpha_{0.61}$ did not change but remained at 0.93.

It should also be pointed out that this magnetic treatment is effective at room temperatures which distinguishes it from magnetic annealing, a process which is carried out at elevated temperatures in a magnetic field.

FIGURES 2*a* to 2*d* are drawings of hysteresis loops obtained with prior art materials and with materials according to the invention.

All four loops were recorded at the same scales in B and H.

Figure 2:
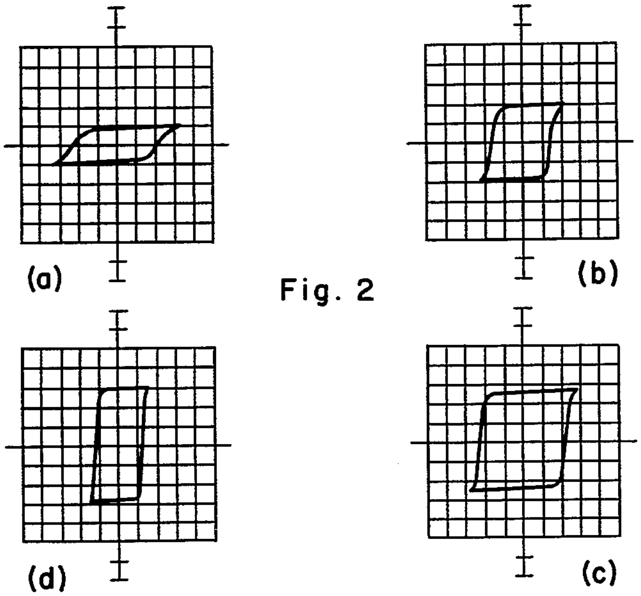
FIGURE 2 are drawings of hysteresis loops obtained on an oscilloscope with materials representative of available square loop ferrities and of materials made according to the invention subject to a 60 cycle per second alternating field.

FIGURE 2*a* is a drawing of a hysteresis loop of a commmercially available magnesium-manganese ferrite. While the hysteresis loop has rectangularity, the corners are rounded; the slope of the sides departs markedly from the vertical; and $\alpha_{0.61}$ is 0.14.

FIGURE 2*b* is a drawing of a hysteresis loop of a copper-manganese ferrite disclosed in U.S. Patent 2,818,387, Sample 9. This material has an $\alpha_{0.61}$ of 0.79.

FIGURES 2*c* and 2*d* are drawings of two hysteresis loops of two materials according to the invention, i.e., Sample 9 and Sample 38 in Table I. The corners of the loops are very sharp; the values of $\alpha_{0.61}$ are 0.91 and 0.93 respectively. It is also significant to note that values of $B_m$ and $B_r$ are much higher than those of either the copper-manganese or the magnesium-manganese ferrites. This enables more energy to be stored in the cores.

The ferromagnetic materials prepared in accordance with the invention exhibit high squareness ratios which means that the polarization of the core is not changed by pulses of reverse polarity of amplitudes less than 0.61 times that of the critical value, $H_m$.

These materials are further characterized by low values of $H_c$ which enables moderate current pulses to initiate the change in polarization state of the material. A still further advantage of our materials is the high magnetic induction, i.e., $B_m$, which further enhances the output signal level upon a change in the polarization state.

The materials according to our invention may also be used in magnetic switching applications and pulse activated devices.

While we have described our invention in connection with specific embodiments and applications other modifications thereof will be readily apparent to those skilled in the art without departure from the spirit and scope of the invention.

What we claim is:

1. A ferromagnetic ferrite having a substantially square hysteresis loop consisting essentially of the reaction product formed by heating about 10 to 48.5 mol. percent of NiO, about 1.5 to 32.5 mol. percent ZnO, about 0.2 to 7.0 mol. percent of CoO, about 0.2 to 7.5 mol. percent of CuO, and about 47.5 to 49.8 mol. percent of ferric oxide for about 2 to 10 hours at 1000° C. to 1300° C. under non-reducing conditions, said ferrite having a coercive force of less than about 5 oersted and an $\alpha_{0.61}$ of at least 0.5.

2. A ferromagnetic ferrite having a substantially square hysteresis loop consisting essentially of the reaction product formed by heating about 15 to 42.5 mol. percent of NiO, about 10 to 30 mol. percent of ZnO, about 0.5 to 5 mol. percent of CoO, about 0.5 to 5 mol. percent of CuO, and about 48.5 to 49.5 mol. percent of ferric oxide for about 2 to 10 hours at 1000° C. to 1300° C. under non-reducing conditions, said ferrite having a coercive force of less than about 5 oersted and an $\alpha_{0.61}$ of at least 0.5.

3. A ferromagnetic ferrite having a substantially square hysteresis loop consisting essentially of the reaction product formed by heating about 10 to 48.5 mol. percent of NiO, about 1.5 to 32.5 mol. percent of ZnO, about 0.2 to 7.0 mol. percent of CoO, about 0.2 to 7.5 mol. percent of CuO, and about 47.5 to 49.8 mol. percent of ferric oxide for about 2 to 10 hours at 1050° C. to 1250° C. under non-reducing conditions, said ferrite having a coercive force of less than about 5 oersted and an $\alpha_{0.61}$ of at least 0.5.

4. A ferromagnetic ferrite having a substantially square hysteresis loop consisting essentially of the reaction product formed by heating about 28.67 mol. percent of NiO, about 16.1 mol. percent of ZnO, about 1.38 mol. percent of CoO, about 5.13 mol. percent of CuO, and about 48.72 mol. percent of ferric oxide for about 2 to 10 hours at 1050° C. to 1250° C. under non-reducing conditions, said ferrite having a coercive force of less than about 5 oersted and an $\alpha_{0.61}$ of at least 0.61.

5. A ferromagnetic ferrite having a substantially square hysteresis loop consisting essentially of the reaction product formed by heating about 18.43 mol. percent of NiO, about 27.64 mol. percent of ZnO, about 2.05 mol. percent of CoO, about 2.53 mol. percent of CuO, and about 49.35 mol. percent of ferric oxide for about 2 to 10 hours at 1050° C. to 1250° C. under non-reducing conditions, said ferrite having a coercive force of less than about 5 oersted and an $\alpha_{0.61}$ of at least 0.61.

6. A ferromagnetic ferrite having a substantially square hysteresis loop consisting essentially of the reaction product formed by heating about 18.43 mol. percent of NiO, about 27.64 mol. percent of ZnO, about 2.05 mol. percent of CoO, about 2.53 mol. percent of CuO, and about 49.35 mol. percent of ferric oxide for about 2 to 10 hours at 1000° C. to 1300° C. under non-reducing conditions, said ferrite having a coercive force of less than about 5 oersted and an $\alpha_{0.61}$ of at least 0.61.

7. A ferromagnetic ferrite having a substantially square hysteresis loop consisting essentially of the reaction product formed by heating about 28.15 mol. percent of NiO, about 15.85 mol. percent of ZnO, about 4.10 mol. percent of CoO, about 2.53 mol. percent of CuO, and about 49.37 mol. percent of ferric oxide for about 2 to 10 hours at 1000° C. to 1300° C. under non-reducing conditions, said ferrite having a coercive force of less than 5 oersted and an $\alpha_{0.61}$ of at least 0.61.

References Cited in the file of this patent

UNITED STATES PATENTS

| | | |
|---|---|---|
| 1,997,193 | Kato et al. | Apr. 9, 1935 |
| 2,685,568 | Wilson | Aug. 3, 1954 |
| 2,723,239 | Harvey | Nov. 8, 1955 |
| 2,736,708 | Crowley et al. | Feb. 28, 1956 |

FOREIGN PATENTS

| | | |
|---|---|---|
| 218,668 | Australia | Nov. 26, 1958 |
| 1,125,577 | France | July 16, 1955 |
| 739,134 | Great Britain | Oct. 26, 1955 |
| 751,623 | Great Britain | July 4, 1956 |
| 1,057,256 | Germany | May 14, 1959 |

OTHER REFERENCES

Weil: Comptes Rendus, March 24, 1952, p. 1352.

Harvey et al.: RCA Review, September 1950, pp. 344–349.

Proceedings of the IRE, October 1956, pp. 1294–1311.

J. Institute of Electrical Engineers, Japan, November 1937, p. 5.